US006336677B2

(12) United States Patent
Scott

(10) Patent No.: US 6,336,677 B2
(45) Date of Patent: Jan. 8, 2002

(54) INSIDE FENDER SKIRTS FOR TRAILERS

(76) Inventor: Lonnie J. Scott, 695 Huntington La., Wichita Falls, TX (US) 76306

( * ) Notice: Subject to any disclaimer, the term of this patent is extended or adjusted under 35 U.S.C. 154(b) by 0 days.

(21) Appl. No.: 09/780,387

(22) Filed: Feb. 12, 2001

Related U.S. Application Data

(60) Provisional application No. 60/192,551, filed on Mar. 28, 2000.

(51) Int. Cl.[7] .............................................. B60R 19/00
(52) U.S. Cl. ......................... 296/198; 280/849; 280/770
(58) Field of Search .......................... 296/198; 280/849, 280/848, 770

(56) References Cited

U.S. PATENT DOCUMENTS

| 4,157,200 A |   | 6/1979 | Johnson ........................... 296/1 |
|---|---|---|---|
| D284,575 S |   | 7/1986 | Latas ........................... D12/184 |
| 4,840,400 A |   | 6/1989 | Greenleaf .................... 280/770 |
| D308,953 S | * | 7/1990 | Godbersen ................. D12/106 |
| 4,986,571 A |   | 1/1991 | Godbersen ................... 280/854 |
| D314,735 S |   | 2/1991 | Godbersen ................. D12/106 |
| 5,137,414 A | * | 8/1992 | Sloan et al. ................. 414/477 |
| 5,171,037 A |   | 12/1992 | Thompson et al. ......... 280/770 |
| 5,460,411 A | * | 10/1995 | Becker ......................... 180/851 |
| 5,538,315 A |   | 7/1996 | Dixon .......................... 296/180 |
| D372,449 S |   | 8/1996 | Becker ....................... D12/184 |
| 5,769,478 A |   | 6/1998 | Vernese ..................... 296/24.2 |
| 5,816,616 A |   | 10/1998 | Boyd .......................... 280/847 |

FOREIGN PATENT DOCUMENTS

| BE | 8801219 | 5/1988 | ..................... 25/18 |
|---|---|---|---|
| CA | 1065923 | 11/1979 | ..................... 296/72 |

* cited by examiner

*Primary Examiner*—Joseph D. Pape
(74) *Attorney, Agent, or Firm*—Richard C. Litman

(57) ABSTRACT

Inside fender skirts for deflecting flying road debris away from a boat or car being transported by a trailer. The inside fender skirts can be configured to accommodate single and dual axle trailers with open fenders. Each skirt is bolted to its fender so that the skirt is disposed between the tire and the trailer in order to deflect flying debris.

6 Claims, 3 Drawing Sheets

INSIDE FENDER SKIRTS FOR TRAILERS

CROSS-REFERENCE TO RELATED APPLICATION

This application claims the benefit of U.S. Provisional Patent Application Ser. No. 60/192,551, filed Mar. 28, 2000.

BACKGROUND OF THE INVENTION

1. Field of the Invention

The present invention relates generally to inside fender skirts for trailers with open fenders. The fender skirts prevent road debris propelled by the trailer's tires from damaging the trailer or its hauled contents, and can be used for single axle and double axle trailers.

2. Description of Related Art

Avoiding costly inadvertent damage to valuable, exposed cargo such as a boat, due to flying road debris propelled by the tires of the trailer carrying the boat, is very important because boats frequently need to be transported from one place to another. The cumulative cost of repairing damage to a boat caused by flying stones and gravel is very expensive and the repeated repairs diminish the physical appearance of the boat. Trailers with open fenders are routinely used to transport boats and cars, however, the article being transported by the trailer is highly susceptible to damage caused by flying debris from the wheels of the trailer.

The prior art describes a variety of trailer accessories designed to minimize damage due to rocks hitting the article being transported by the trailer. U.S. Pat. No. Des. 314,735 issued to Godbersen, outlines the design of a boat trailer fender.

Other utility patents are also part of the related art. U.S. Pat. No. 4,157,200 issued to Johnson outlines the use of a road debris deflector that attaches to the forward portion of an open frame boat and deflects road debris thrown rearwardly from the wheels of a vehicle towing the trailer. The road debris deflector has a generally trapezoidal shape and is designed to specifically protect the front portion of a boat trailer or other towing vehicle.

U.S. Pat. No. 4,840,400 issued to Greenleaf outlines the use of a gravel shield for protecting the front lower portion of a trailer of the type which is hitched to a vehicle via a tongue member frame. More particularly, the invention relates to a gravel shield adapted to cooperate with the tongue frame member of a travel trailer so as to be disposed above and to the sides of the tongue frame member adjacent to the lower part of the trailer.

U.S. Pat. No. 4,986,571 issued to Godbersen outlines the use of a fender guard associated with and protecting the fenders mounted on a utility type trailer or similar vehicle. The fender guard includes a plurality of generally parallel, laterally spaced rails or frame members that overlie the upper surface of a fender with downwardly and outwardly inclined end portions forming a continuation of the rails or frame members having an attaching bracket at the lower end thereof for mounting on the trailer frame or other rigid component of the trailer.

U.S. Pat. No. 5,171,037 issued to Thompson et al. outlines the use of a fender guard associated with and protecting the fenders mounted on a utility type trailer or similar vehicle. The fender guards are provided for each of the fenders on a vehicle of the type having fenders with exposed, upwardly facing surfaces subject to damage by contact with equipment, loads and by individuals standing on the fenders and using them as steps.

U.S. Pat. No. 5,538,315 issued to Dixon outlines the use of a deflector for reducing rock damage to a trailer having fenders. The deflector shields are secured to opposed sides of a trailer. Each shield is angled outwardly and rearwardly from one of the opposed sides of the trailer to a peripheral edge of a fender. Each deflector shield is of a height at least as high as a top of the fender and is situated in front of each fender.

Canadian patent 300,282 granted to Nicklin outlines the use of a device for reducing wind resistance of a rapidly moving trailer attached to an automobile and protecting such a trailer from being struck by gravel or other loose items on the road. The device is made of a soft, strong weather resistant material, which when unfolded and attached to the front wall of the trailer, takes the form of an open base, four sided pyramid located in a horizontal position between the trailer and the automobile.

Each of these patents describe a device that provides some level of protection to various parts of and types of trailers used to transport boats and other objects. Although each device is useful, none can accommodate a wide variety of trailers. That is what is really needed, a versatile trailer shield or guard that can be used with a variety of trailer types.

None of the above inventions and patents, taken either singly or in combination, is seen to describe the instant invention as claimed.

SUMMARY OF THE INVENTION

The present invention is a configured inside fender skirt for open fender trailers. The semi-circular fender skirt is disposed between the exterior side of the wheel fender and the trailer frame. The inside fender skirt deflects flying road debris such as stones and gravel away from the article being transported by the trailer and eliminates flying road debris as a cause of damage to the article. The inside fender skirt of the present invention can be configured to accommodate single and dual axle trailers with open fenders. The fender skirt is configured to fit the contour of a fender and to provide maximal deflection of flying road debris. The detachable inside fender skirt is readily secured and removed from the inside surface of a trailer fender. The fender skirt is made of a high impact plastic or polyurethane that is strong, durable, and corrosion resistant.

Accordingly, it is a principal object of the invention to provide a road debris deflector that eliminates damage to a vehicle transported by a trailer caused by flying road debris.

It is another object of the invention to provide a road debris deflector that can readily accommodate single and dual axle trailers.

It is a further object of the invention to provide a road debris deflector that can be installed and removed with a minimum amount of effort.

Still another object of the invention is to provide a road debris deflector that is strong and durable.

It is an object of the invention to provide improved elements and arrangements thereof in a road debris deflector for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
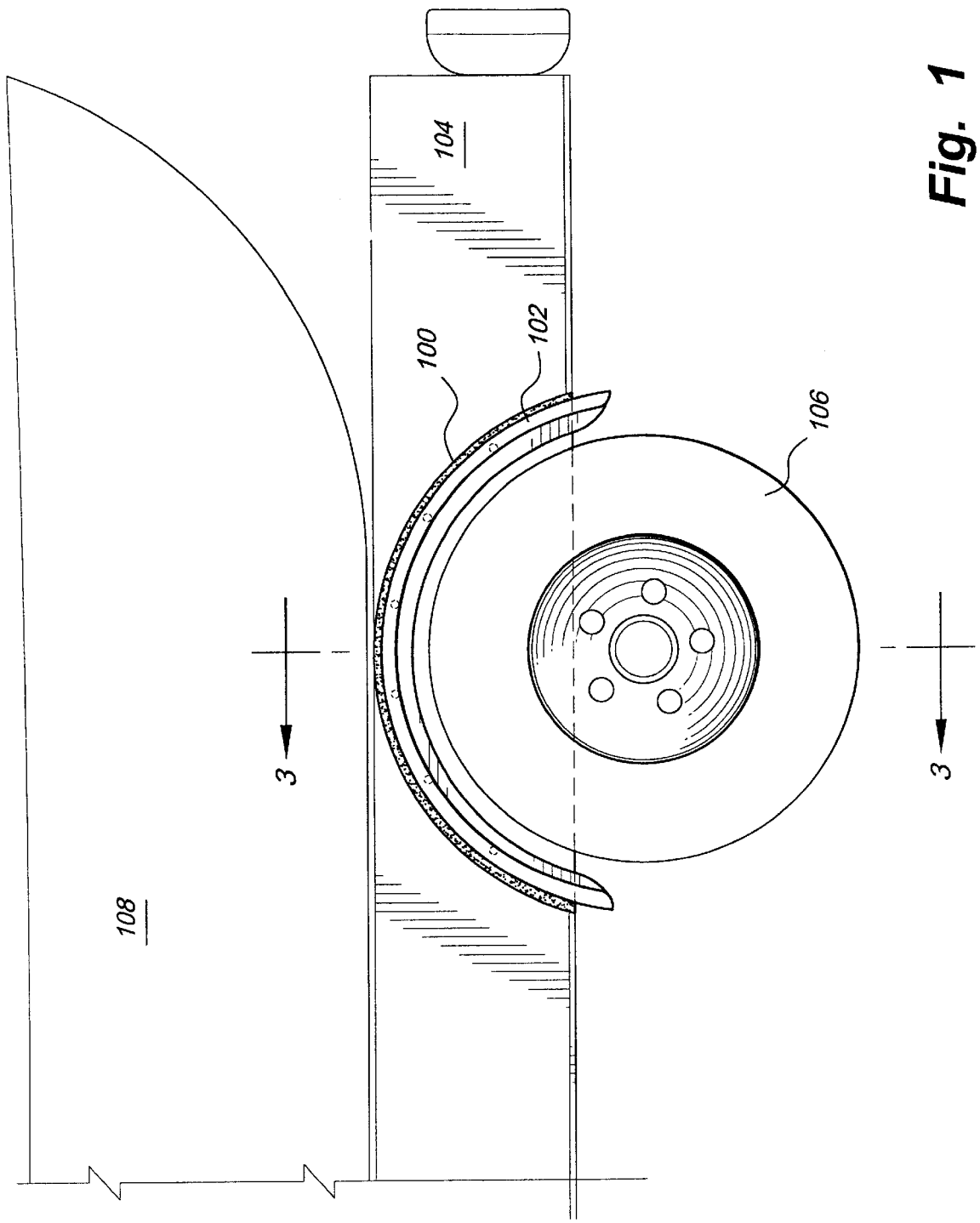
FIG. 1 is an environmental, perspective view of a trailer fitted with a fender skirt carrying a boat according to the present invention.
Figure 2A:
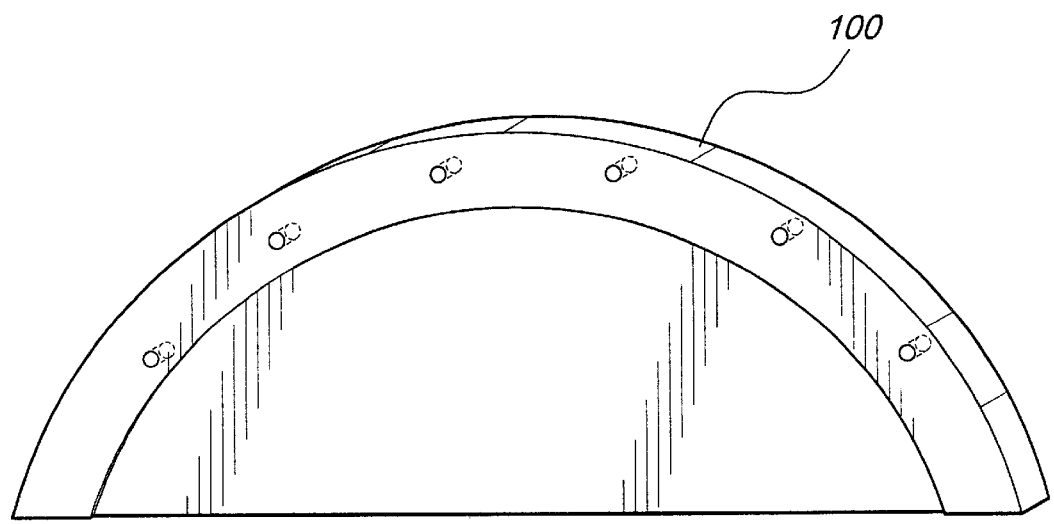
FIG. 2A is a perspective view of a first embodiment of a fender skirt for a single axle trailer.
Figure 2B:
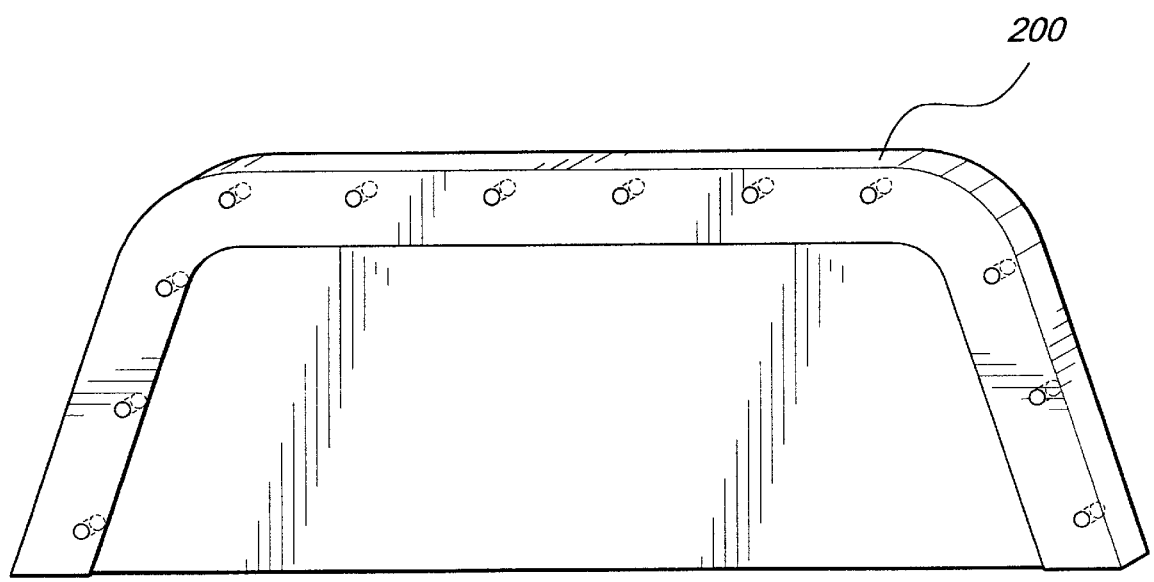
FIG. 2B is a perspective view of a second embodiment of a fender skirt for a dual axle trailer.
Figure 3:
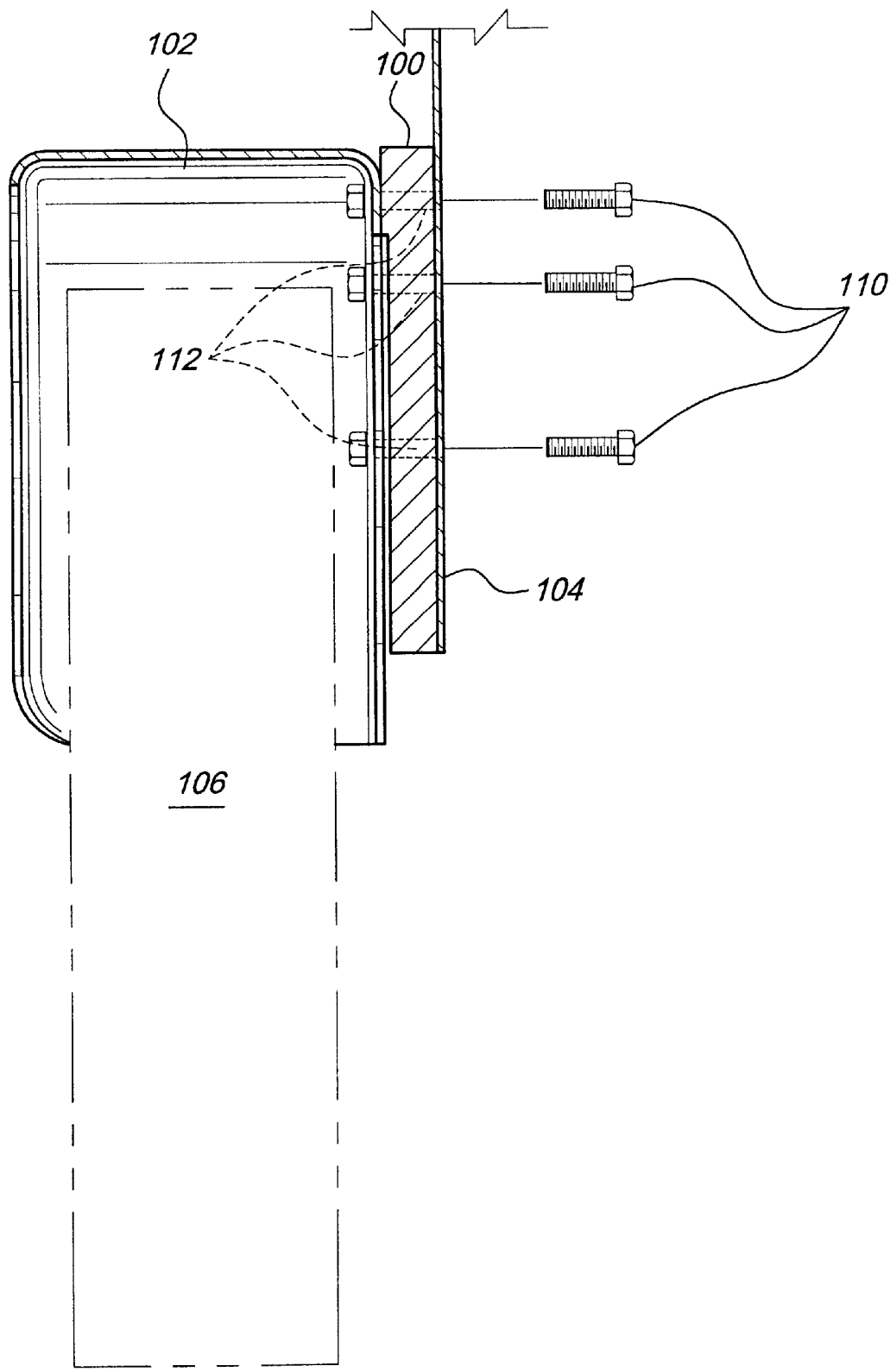
FIG. 3 is a cross-sectional perspective view along line 3—3 in FIG. 1 of a single axle fender skirt mounted on a fender.

The present invention, as depicted in FIGS. 1–3, is an inside fender skirt 100 for trailers 104 and the like. The fender skirt 100 of the present invention is designed to be used on trailers 104 with open fenders 102 such as boat trailers or car trailers. The fender skirt 100 prevents flying road debris propelled by the trailer's tires 106 from striking any article 108 carried by the trailer 104, by deflecting any flying road debris away from the article carried by the trailer 104, thus preventing costly inadvertent damage to the article 108.

FIG. 1 shows an environmental, perspective view of a trailer 104 fitted with a fender skirt 100 carrying an article 108. In a preferred embodiment, the fender skirt 100 is made of durable, high impact-resistant plastic or polyurethane. Therefore, the fender skirt 100 will not shatter due to a high velocity impact with a rock and the fender skirt 100 will not corrode due to repeated exposure to the elements.

In the first embodiment, the fender skirt 100 has a crescent or semi-circular configuration as depicted in FIG. 2A. FIG. 2A is a perspective view of the first embodiment of a fender skirt 100 for a single axle trailer 104. The semi-circular configuration shown in FIG. 2A is designed to accommodate the single axle (not shown) of a single axle trailer 104.

FIG. 2B is a perspective view of a second embodiment of a fender skirt 200 for a dual axle trailer (not shown). The semi-circular configuration is modified to accommodate the second axle (not shown) of a dual axle trailer. The innovative design of the dual axle fender skirt 200 allows the fender skirt 200 to efficiently deflect flying rocks and other road debris away from the boat 108 carried by the trailer 104 without disturbing the normal motion of the tires 106 of the dual axle trailer 104.

The fender skirt 100 of the present invention can be sized up or down to accommodate a specific fender (make of fender) and the number of axles. The fender skirt 100 can be removed from the fender of one trailer and attached to the fender of another trailer, which makes the fender skirt 100 extremely cost effective. The fender skirt 100 is designed to provide a maximum deflection area for deflecting road debris without disrupting the normal motion of the trailer's tires 106.

The fender skirt 100 is specially configured to provide maximum protection from impact damage due to flying rocks and other debris while snugly fitting the contour of a trailer's fender 102, so not to impede the normal motion of the trailer's tires 106. The fender skirt 100 can be bolted or secured to the inside surface of the portion of a fender 102 adjacent to the trailer 104.

As depicted in FIG. 3, the fender skirt 100 has an attachment means for attaching the fender skirt to an inner side of the open fender. The attachment means is a plurality of bolts 110 inserted into a plurality of holes 112 provided on the inside surface of the lateral portion of the fender 102. The attachment means could also be metal screws as well. The sturdy attachment means ensures that the attachment between the fender skirt 100 and the fender 102 does not loosen because of mechanical vibrations caused by road travel.

The preferred embodiments of the present invention disclosed herein are intended to be illustrative only and are not intended to limit the scope of the invention. It should be understood by those skilled in the art that various modifications and adaptations of the prevent invention as well as alternative embodiments of the prevent invention may be contemplated.

It is to be understood that the present invention is not limited to the sole embodiments described above, but encompasses any and all embodiments within the scope of the following claims.

I claim:

1. A fender skirt in combination with an open fender of a single axle trailer, said combination comprising:

an open fender of a single axle trailer having a frame and a tire, said open fender having an inner side adjacent the frame of the trailer;

a fender skirt disposed between the tire and frame of the trailer, said fender skirt having a unitary semi-circular shaped body removably attached to the inner side of said open fender; and means for attaching said fender skirt to the inner side of the open fender;

whereby, the fender skirt deflects flying road debris to prevent damage to the trailer and its contends.

2. The combination according to claim 1, wherein said fender skirt is made of a high impact-resistant material.

3. The combination according to claim 1, wherein said fender skirt and the inner side of said open fender include a plurality of holes, and said attaching means include a plurality of bolts inserted through the plurality of holes.

4. A fender skirt in combination with an open fender of a double axle trailer, said combination comprising:

an open fender of a double axle trailer having a frame and a tire, said open fender having an inner side adjacent the frame of the trailer;

a fender skirt disposed between the tire and frame of the trailer, said fender skirt having a unitary trapezoital shaped body removably attached to the inner side said open fender; and means for attaching said fender skirt to the inner side of the open fender;

whereby, the fender skirt deflects flying road debris to prevent damage to the trailer and its contends.

5. The combination according to claim 4, wherein said fender skirt is made of a high impact-resistant material.

6. The combination according to claim 4, wherein said fender skirt and the inner side of said open fender include a plurality of holes, and said attaching means include a plurality of bolts inserted through the plurality of holes.

* * * * *